(12) United States Patent
Dai

(10) Patent No.: US 8,363,934 B2
(45) Date of Patent: Jan. 29, 2013

(54) IMAGE PROCESSING APPARATUS, IMAGE PROCESSING METHOD, AND COMPUTER PROGRAM

(75) Inventor: Xiaoyan Dai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 431 days.

(21) Appl. No.: 12/639,891

(22) Filed: Dec. 16, 2009

(65) Prior Publication Data

US 2010/0158360 A1 Jun. 24, 2010

(30) Foreign Application Priority Data

Dec. 17, 2008 (JP) ................. 2008-321625

(51) Int. Cl.
*G06K 9/00* (2006.01)
*G06K 9/34* (2006.01)
(52) U.S. Cl. ....................... 382/164; 382/180
(58) Field of Classification Search ........... 382/164, 382/180
See application file for complete search history.

(56) References Cited

U.S. PATENT DOCUMENTS

| 5,680,478 A * | 10/1997 | Wang et al. ........ 382/176 |
| 6,993,185 B2 * | 1/2006 | Guo et al. ........ 382/176 |
| 2006/0045386 A1 | 3/2006 | Fukuoka |
| 2007/0025617 A1 * | 2/2007 | Dai et al. ........ 382/180 |
| 2007/0086667 A1 * | 4/2007 | Dai et al. ........ 382/242 |
| 2009/0128871 A1 * | 5/2009 | Patton et al. ........ 358/520 |

FOREIGN PATENT DOCUMENTS

| JP | 09-006946 A | 1/1997 |
| JP | 2003-087562 A | 3/2003 |
| JP | 2004-265384 | 9/2004 |
| JP | 2006-344069 | 12/2006 |

OTHER PUBLICATIONS

Athitsos, V.; Swain, M.J.; Frankel, C.; , "Distinguishing photographs and graphics on the World Wide Web," Content-Based Access of Image and Video Libraries, 1997. Proceedings. IEEE Workshop on , vol., no., pp. 10-17, Jun. 20, 1997.*

* cited by examiner

*Primary Examiner* — Bhavesh Mehta
*Assistant Examiner* — Utpal Shah
(74) *Attorney, Agent, or Firm* — Canon USA Inc. IP Division

(57) ABSTRACT

An image processing apparatus includes a color region segmentation unit configure to segment a processing object image into color regions, a linkage information acquisition unit configured to acquire information about linkage regions in each segmented color region, a determination unit configured to determine whether the processing object image is graphics based on the information acquired by the linkage information acquisition unit.

11 Claims, 11 Drawing Sheets

4a

4b

4a

| CLUSTER NUMBER | NUMBER OF LABELS | NUMBER OF PIXELS |
|---|---|---|
| 1: | 185 | 55060 |
| 2: | 227 | 64965 |
| 3: | 30 | 53337 |
| 4: | 171 | 11044 |
| 5: | 223 | 3227 |
| 6: | 188 | 238679 |
| 7: | 106 | 9161 |
| 8: | 362 | 35903 |
| 9: | 192 | 17356 |
| 10: | 81 | 10276 |
| 11: | 262 | 75222 |
| 12: | 164 | 20572 |

4b

| CLUSTER NUMBER | NUMBER OF LABELS | NUMBER OF PIXELS |
|---|---|---|
| 1: | 4 | 138532 |
| 2: | 171 | 80868 |
| 3: | 654 | 1721 |
| 4: | 393 | 1576 |
| 5: | 15 | 81977 |
| 6: | 3 | 4336 |
| 7: | 289 | 480 |
| 8: | 65 | 243 |
| 9: | 15 | 38 |
| 10: | 4 | 2016 |
| 11: | 235 | 12945 |
| 12: | 24 | 180 |

7a: Magnified view of part of 4a

7b: Magnified view of part of 4b

7c: Magnified view of result of clustering processing of 7a

7d: Magnified view of result of clustering processing of 7b

10a

10b

10a

| CLUSTER NUMBER | NUMBER OF LABELS | NUMBER OF PIXELS |
|---|---|---|
| 1: | 4 | 138532 |
| 2: | 171 | 80868 |
| 3: | 654 | 1721 |
| 4: | 393 | 1576 |
| 5: | 15 | 81977 |
| 6: | 3 | 4336 |
| 7: | 289 | 480 |
| 8: | 65 | 243 |
| 9: | 15 | 38 |
| 10: | 4 | 2016 |
| 11: | 235 | 12945 |
| 12: | 24 | 180 |

10b

| CLUSTER NUMBER | NUMBER OF LABELS | NUMBER OF PIXELS |
|---|---|---|
| 1: | 359 | 2947 |
| 2: | 3501 | 61364 |
| 3: | 5136 | 18086 |
| 4: | 663 | 12634 |
| 5: | 1087 | 4256 |
| 6: | 589 | 875 |
| 7: | 27 | 29459 |
| 8: | 3245 | 36255 |
| 9: | 767 | 7971 |
| 10: | 291 | 6954 |
| 11: | 79 | 19516 |
| 12: | 458 | 1233 |

IMAGE PROCESSING APPARATUS, IMAGE PROCESSING METHOD, AND COMPUTER PROGRAM

BACKGROUND OF THE INVENTION

1. Field of the Invention

The present invention relates to an image processing apparatus and an image processing method for processing a color document image.

2. Description of the Related Art

Recently, computerization of information advances, and a system for computerizing a paper document by scanning using a scanner, storing the computerized information, and transmitting it to another apparatus has been widely popularized. In such a system, high compressibility for a computerized document is required for reducing a transmission cost. However, in a case where a text region and a photo region intermingle in a document image, when a user performs proper compression for the text region, an image quality comes to be good, but a compression ratio decreases. When a user performs proper compression for the photo region, a compression ratio is high but a text comes to deteriorate. Further, it is desired that computerized data has reusability capable of partially editing and high image quality in which image quality is not damaged even when the image is magnified or reduced.

To address these issues, Japanese Patent Application Laid-Open No. 2004-265384 discusses a method for attaining high compressibility, reusability, and high image quality of a document image. The method includes segmenting a computerized document image into a text region and a photo region, converting the text region, in which the reusability and high image quality are seriously considered, into vector data, performing Joint Photographic Experts Group (JPEG) compression on a region other than the text region, which can not be simply reproduced by vectorization, for example, the photo region, combining the vector data and the compression data acquired from each region, and outputting the combined data.

Japanese Patent Application Laid-Open No. 2004-265384 discusses a method for converting a region including the attribute of text, line, line drawing, or table into vector data. Further, Japanese Patent Application Laid-Open No. 2006-344069 discusses a method for, to expand the range of vectorization processing objects, vectorizing also an image having characteristics, for example, having a clear contour of an object image, i.e., a clear boundary of color, and a limited appearance color. Such an image is, for example, an illustration image. Hereinafter, such an image having a feature suitable for vectorization processing (for example, an illustration image) is referred to as "graphics" (or "a graphic image"). In addition, the method discussed in Japanese Patent Application Laid-Open No. 2006-344069 includes segmenting such a graphic image into color regions by a degree of color similarity, approximating a contour of each color region by an outline method, adding color information to vector data, and outputting the data.

On the other hand, since a photo region and graphics, such as an illustration image, have a similar characteristic in many case, it is difficult to accurately distinguish between a photo region and graphics in a document image, so that a photo region may be erroneously determined to be graphics. If an image processing apparatus vectorizes a photo region that is erroneously determined to be graphics, the image quality or compression ratio may decrease.

SUMMARY OF THE INVENTION

According to an aspect of the present invention, an image processing apparatus includes a color region segmentation unit configured to segment a processing object image into color regions, a linkage information acquisition unit configured to acquire information about linkage regions in each segmented color region, and a determination unit configured to determine whether the processing object image is graphics based on the information acquired by the linkage information acquisition unit.

According to an exemplary embodiment of the present invention, the image processing apparatus can increase determination accuracy of graphics in a document image. Therefore, possibility of error determination making a photo region to be graphics comes to be low. For example, compressibility and quality of a document image can be increased by making graphics to be a vectorization processing object and not making a photo region to be a vectorization processing object.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
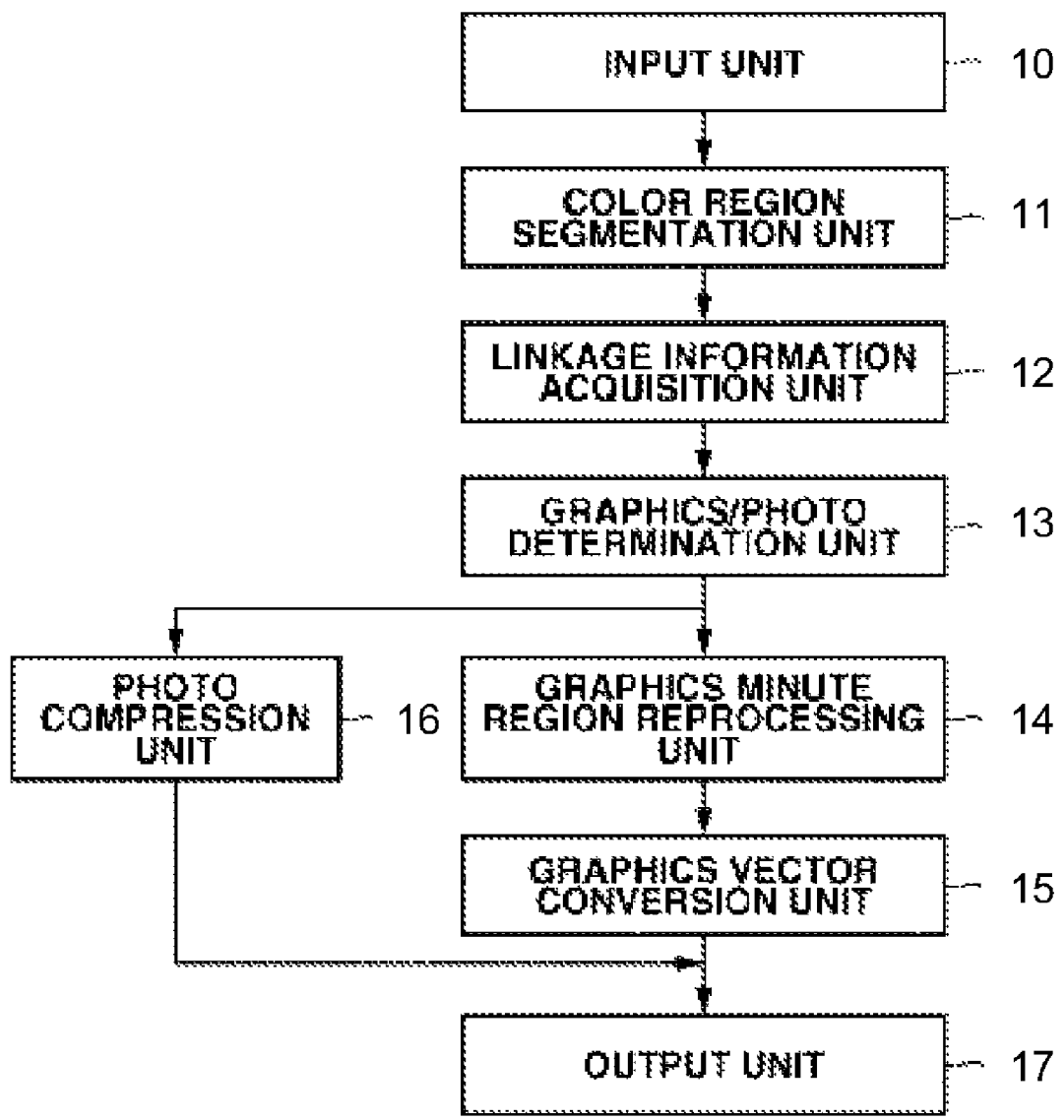
FIG. 1 is a block diagram illustrating a configuration of an image processing apparatus according to a first exemplary embodiment of the present invention.

FIG. 1 is a block diagram illustrating a configuration of an image processing apparatus according to a first exemplary embodiment of the present invention. The image processing apparatus includes a function for switching between vectorizing and compressing according to a graphics/photo determination processing and determination result in vectorization processing. An input unit 10 inputs a processing object image. In addition, the input unit 10 can be a scanner for scanning an image and inputting the image and can be an interface for receiving a processing object image. Further, a processing object image to be input may be an image of a region other than regions determined as text, line drawing, line, or table in regions segmented by conventional region segmentation processing. A color region segmentation unit 11 performs color region segmentation processing for segmenting an input processing object image into regions for respective colors (color regions). A linkage information acquisition unit 12 performs identification (labeling processing) of linked pixels configuring each color region, and acquires information about the linked pixels (linkage information). A graphics/photo determination unit 13 determines whether a processing object image is graphics or photo based on the linkage information. A graphics minute region reprocessing unit 14 reprocesses noise regions generated by scanning or compressing in an image determined as graphics. A graphics vector conversion unit 15 vectorizes the color regions where noises are removed. A photo compression unit 16 compresses an image region determined as photo by JPEG. An output unit 17 outputs a processing result with one collected file, for example, an extensible markup language (XML) file.

Figure 2:
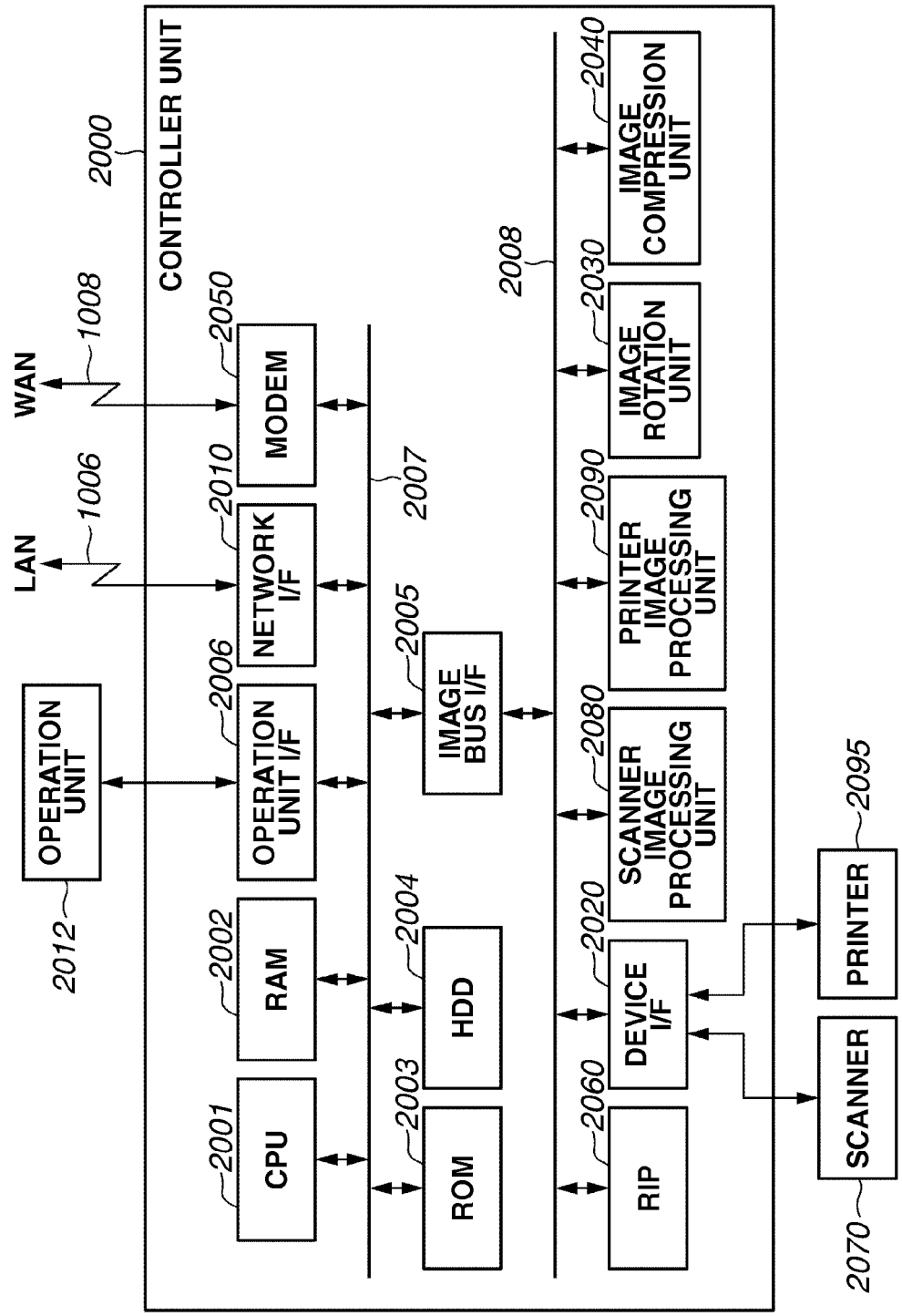
FIG. 2 is a block diagram illustrating a configuration of a main portion of a multifunction peripheral (MFP), which is an example of the image processing apparatus illustrated in FIG. 1.

FIG. 2 is a block diagram illustrating a configuration of a main portion of a multifunction peripheral (MFP), which is an example of the image processing apparatus illustrated in FIG. 1. In addition, in the present exemplary embodiment, a multifunction peripheral (MFP) having a scanner function and a printer function is used as an image processing apparatus, but a system connecting a general used scanner and a personal computer can be used as the image processing apparatus.

As illustrated in FIG. 2, the MFP includes a controller unit 2000 functioning as an image processing apparatus. The controller unit 2000 connects with a scanner 2070, which is an input device, and a printer 2095, which is an image output device, via a device interface (I/F) 2020. Further, the controller unit 2000 can also perform control for attaining a copy function by reading image data from a document image by the printer 2070 and printing and outputting the image data by the printer 2095. Furthermore, the controller unit 2000 can perform control for inputting/outputting a pattern image or device information between other apparatuses via a local area network (LAN) 1006 or a wide area network (WAN) 1008.

The controller unit 2000 includes a central processing unit (CPU) 2001 as illustrated in FIG. 2. The CPU 2001 start up an operating system (OS) by a boot program stored in a read only memory (ROM) 2003. Then, the CPU 2001 performs various processing such as the processing in the present exemplary embodiment on the OS by executing a computer program (an application program) stored in a hard disk drive (HDD) 2004. In other words, the computer program stored in a computer readable storage medium such as an HDD is a program for causing the computer (CPU) to function as each processing unit illustrated in FIG. 1. Further, a random access memory (RAM) 2002 is used as a work area for the CPU 2001. The RAM 2002 provides not only a work area for the CPU 2001 but also an image memory area for temporally storing image data. The HDD 2004 stores image data together with the aforementioned application program. In addition, in the present exemplary embodiment, a computer executes a computer program to attain the various processing illustrated in FIG. 1. However, a part or the whole of the processing can be attained by an electronic circuit.

The CPU 2001 connects with the ROM 2003 and RAM 2004 via a system bus 2007. Further, the CPU 2001 connects with an operation unit interface (operation unit I/F) 2006, a network interface (network inter I/F) 2010, a modem 2050, and an image bus interface (image bus I/F) 2005.

The operation unit I/F 2006 is an interface for connecting with an operation unit 2012 including a touch panel. The operation I/F 2006 outputs an image data for displaying in the operation unit 2012 to the operation unit 2012. Further, the operation I/F 2006 outputs instruction information input from a user via the operation unit 2012 to the CPU 2001.

The network I/F 2010 connects with the LAN 1006 and performs input/output of information between each apparatus connected with the LAN 1006 via the LAN 1006. A modem 2050 connects with the public line (WAN) 1008 and performs input/output of information between other apparatuses via the public line 1008.

An image bus I/F 2005 is a bus bridge for connecting the system bus 2007 and an image bus 2008 transferring an image data at high speed, and for changing a data structure. The image bus 2008 is configured with a peripheral component interconnect (PCI) bus or Institute of Electrical and Electronic Engineers (IEEE) bus 1394. The image bus 2008 connects with a raster image processor (RIP) 2060, a device I/F 2020, a scanner image processing unit 2080, a printer image processing unit 2090, an image rotation unit 2030, a thumbnail generation unit 2035, and an image compression unit 2040.

The RIP 2060 is a processor for rasterizing page-description language (PDL) code to a bitmap image. The device I/F 2020 connects the scanner 2070 and the printer 2095, and performs synchronous/asynchronous conversion. The scanner image processing unit 2080 performs correction processing, conversion processing, and editing processing on input image data. The printer image processing unit 2090 performs correction and resolution conversion with respect to output image data at the time of printing. The image rotation unit 2030 performs rotation of an image. The image compression unit 2040 has a function for compressing multi-valued image data to JPEG data, and for compressing binary image data to the data such as Joint Bi-level Image Experts Group (JBIG), Modified Modified READ (relative element address designate) (MMR), and Modified Huffman (MH) data. Further, the image compression unit 2040 also has a function for decompressing these data.

Figure 3:
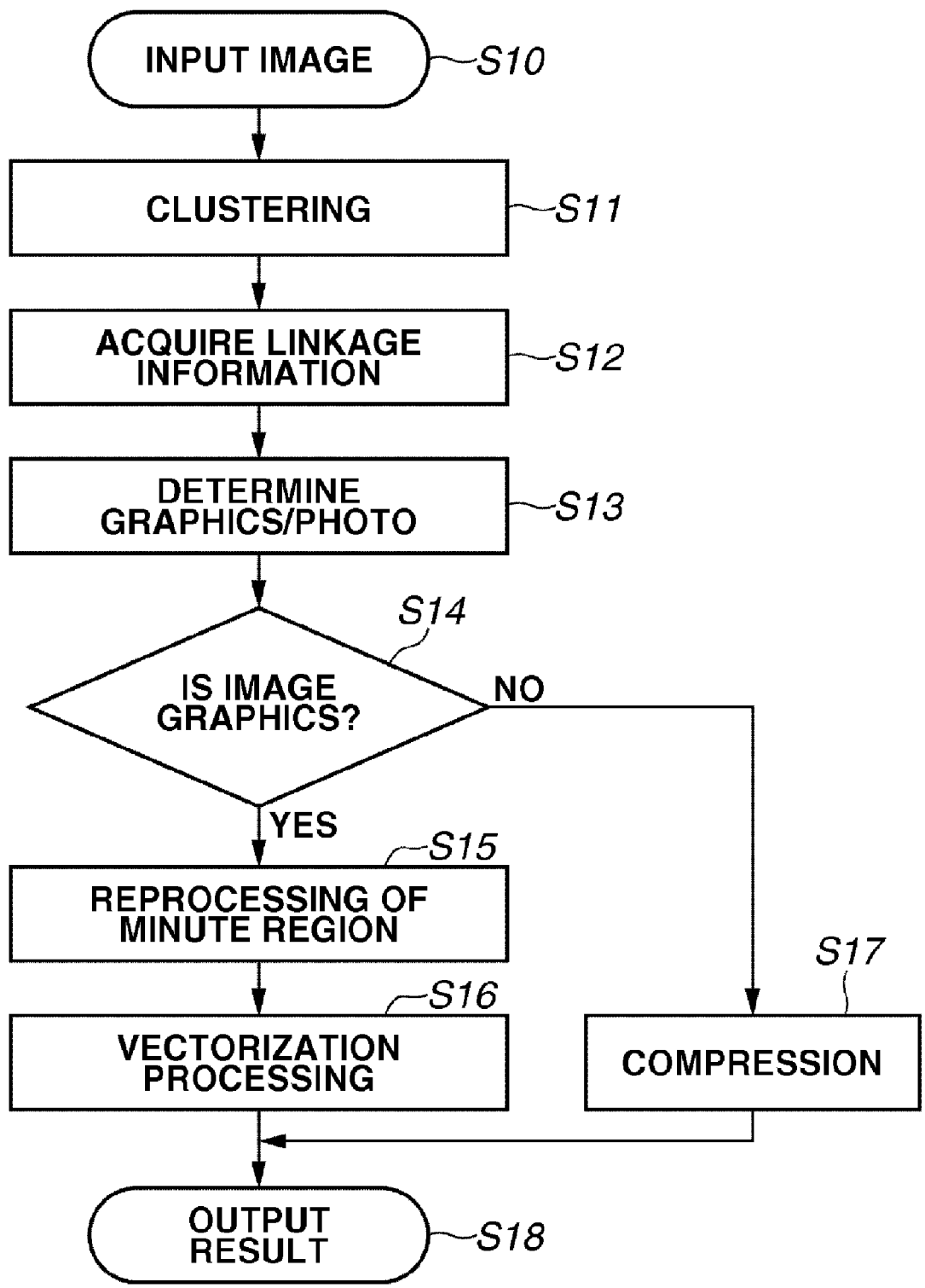
FIG. 3 is a flow chart illustrating a process for switching between vectorization processing and compression processing according to determination of graphics/photo in the first exemplary embodiment of the present invention.

FIG. 3 is a flow chart illustrating a process for switching between vectorization processing and compression processing according to determination of graphics/photo. In the present exemplary embodiment, when the CPU 2001 executes a computer program, the image processing apparatus performs the processing according to the flow chart in FIG. 3 and attains each functional block diagram illustrated in FIG. 1. More specifically, the processing in step S10 in FIG. 3 corresponds to the processing performed by the input unit 10 in FIG. 1. Further, the processing in Step S11 in FIG. 3 corresponds to the processing performed by the color region segmentation unit 11 in FIG. 1. The processing in step S12 in FIG. 3 corresponds to the processing performed by the linkage information acquisition unit 12 in FIG. 1. The processing in step S13 in FIG. 3 corresponds the processing performed by the graphics/photo determination unit 13 in FIG. 1. The processing in step S15 in FIG. 3 corresponds to the processing performed by the graphics minute region reprocessing unit 14 in FIG. 1. The processing in step S16 in FIG. 3 corresponds to the processing performed by the graphics vector conversion unit 15 in FIG. 1. The processing in step S17 in FIG. 3 corresponds to the processing performed by the photo compression unit 16 in FIG. 1. The processing in step S18 in FIG.

3 corresponds the processing performed by the output unit 17 in FIG. 1. These processing steps are described below with reference to FIG. 3.

At first, in step S10, the input unit 10 inputs an image which is a processing object. The input image may be a photo image or a graphics image.

In step S11, the color region segmentation unit 11 performs color region segmentation for segmenting the input image into regions for respective colors (color regions). In the present exemplary embodiment, the color region segmentation unit 11 attains the color region segmentation of the image by clustering processing. The clustering processing is described below in detail.

In step 12, the linkage information acquisition unit 12 acquires information about clusters (linkage information), for example, the number of labels and number of pixels in each cluster. This linkage information acquisition processing is described below using examples.

In step S13, the graphics/photo determination unit 13 determine whether the image is graphics or photo based on the number of labels and the number of pixels in each cluster which is acquired in step S12. The graphics/photo determination processing is also described below. In step S14, the graphics/photo determination unit 13 determines whether the image is determined as graphics or determined as photo by the determination processing in step S13. If the image is determined as graphics (YES in step S14), the processing proceeds to step S15. If the image is determined as photo (NO in step S14), the processing proceeds to step S17.

In step S15, the graphics minute region reprocessing unit 14 searches a noise region (a minute region) and performs reprocessing. In step S16, the graphics vector conversion unit 15 performs vectorization for converting each color region, in which the noise is reprocessed (the noise is removed), into vector data. A conventional technology can apply to the vectorization processing to the extracted region. For example, Japanese Patent No. 2885999 discusses a method for performing vectorization processing by tracking an outline of binary image data and selecting a coordinate vector thereof.

In step S17, the photo compression unit 16 compresses the region determined as photo by JPEG, or the like.

In step S18, the output unit 17 outputs the result of the vectorization of the image in step S16, or the result of the compression of the image in step S17. In addition, when a user makes a plurality of partial regions extracted from a document image to be a processing object image, the CPU 2001 can perform vectorization processing or compression processing on each region, collect these data into one file, and output the file.

Figure 4:
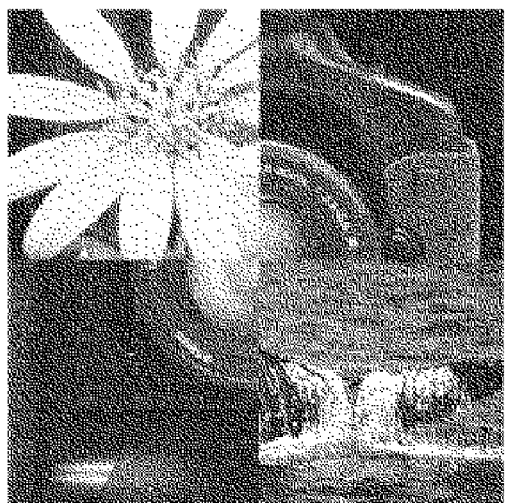
FIG. 4 illustrates examples of an input image.
Figure 4:
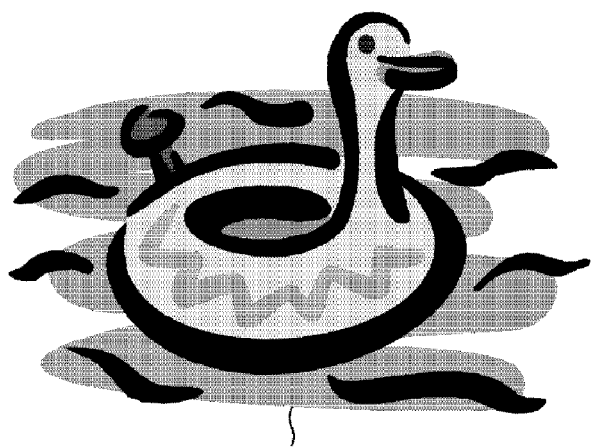

Images 4a and 4b in FIG. 4 illustrate examples of an input image. As aforementioned, the input image may be the photo image 4a or the graphics image 4b. In this case, only an image is used as an example. However, it is possible that the image processing apparatus segments the document image into some regions, such as text, line drawing, line, table, photo, and graphics regions, and uses the regions other than the regions of text, line drawing, line, and table as an input image. In addition, the input image is adopted as a color image or a gray image.

The clustering processing of an image is described. The color region segmentation unit 11 performs the clustering processing by raster-scanning each pixel of an input image and determining that each pixel belongs what cluster.

At first, the color region segmentation unit 11 generates starting pixels acquired by raster-scanning an input image as a first cluster. Then, the color region segmentation unit 11 acquires a degree of similarity of color between the all clusters already generated with respect to a pixel which is a next processing object. More specifically, the color region segmentation unit 11 compares a color of the pixel, which is a processing object, with a color of each cluster, and calculates the degree of similarity of color with respect to each cluster. In addition, the color region segmentation unit 11 can acquire the color of cluster by, for example, acquiring a color region belonging to each cluster based on an average value of color of pixels belonging to each cluster and a dispersion in a color space. It can be considered that when the degree of similarity comes to be higher, the features of the pixel and the cluster are more similar. In this case, red, green, and blue (RGB) values are used for calculation of the degree of similarity of color, but other color space information or information other than color can be used as a feature amount of information. Then, the color region segmentation unit 11 records the highest degree of similarity and a cluster number corresponding to the highest degree of similarity, and compares this degree of similarity with a predetermined threshold value. When the degree of similarity is equal to or greater than the threshold value, the color region segmentation unit 11 makes the object pixel to belong to the recorded cluster. When the degree of similarity is less than the threshold value, the color region segmentation unit 11 generates a new cluster with the object pixel. The color region segmentation unit 11 repeats this processing until the processing for all of the pixels ends.

Then, the color region segmentation unit 11 performs cluster integration processing based on the result of the aforementioned clustering processing. At first, the color region segmentation unit 11 inputs target value of number of clusters (number of color regions) to be segmented. In the present exemplary embodiment, this value is made to be a guide value for segmenting colors how many. Then, the color region segmentation unit 11 counts a current number of clusters. The color region segmentation unit 11 compares the current number of clusters with the target value. When the current number of clusters is greater than the target value, the color region segmentation unit 11 integrates the clusters. In the integration processing, the color region segmentation unit 11 calculates a degree of similarity between clusters, and integrates two clusters, which have the highest degree of similarity in the calculated clusters. The region integration processing is repeated until the current number of clusters comes to be smaller than the target value.

Figure 5:
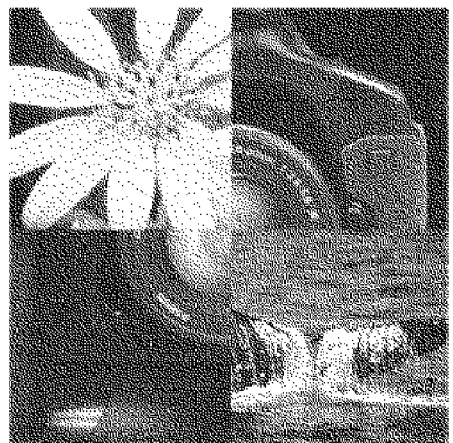
FIG. 5 illustrates examples of linkage information acquired after clustering processing.
Figure 5:
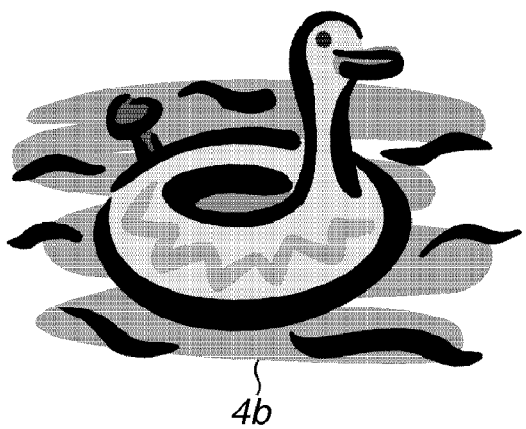

FIG. 5 is illustrates examples of a result of linkage information acquired after the linkage information acquisition unit 12 performs clustering processing on the images 4a and 4b illustrated in FIG. 4. In these examples, the target value in the clustering processing is 12 and clusters are separated into clusters having respective cluster numbers 1 to 12 for 12 colors. The linkage information acquisition unit 12 performs labeling processing for pixels belonging to each cluster and acquires the number of labels. The labeling processing is for giving the same label with respect to pixels linking at either of vertical, horizontal, and oblique positions (adjoining pixels), and other labels are given to the linked pixels in the distant position. In other words, a pixel group given the same label forms a single linkage region. The linkage information acquisition unit 12 requires the number of labels based on a result of the labeling processing for the pixels belonging to each cluster. More specifically, the number of labels indicates that how many linkage regions (groups of linked pixels) are present in pixels determined to belong to the same color cluster. Further, the linkage information acquisition unit 12 acquires the number of pixels belonging to each cluster. FIG. 5 illustrates an acquired result of a cluster number, the number of labels in each cluster, and the number of pixels belonging to each cluster for each of the processing object images 4a and 4b. In the present exemplary embodiment, the cluster number, the number of labels, and the number of pixels are referred to as linkage information.

Figure 6:
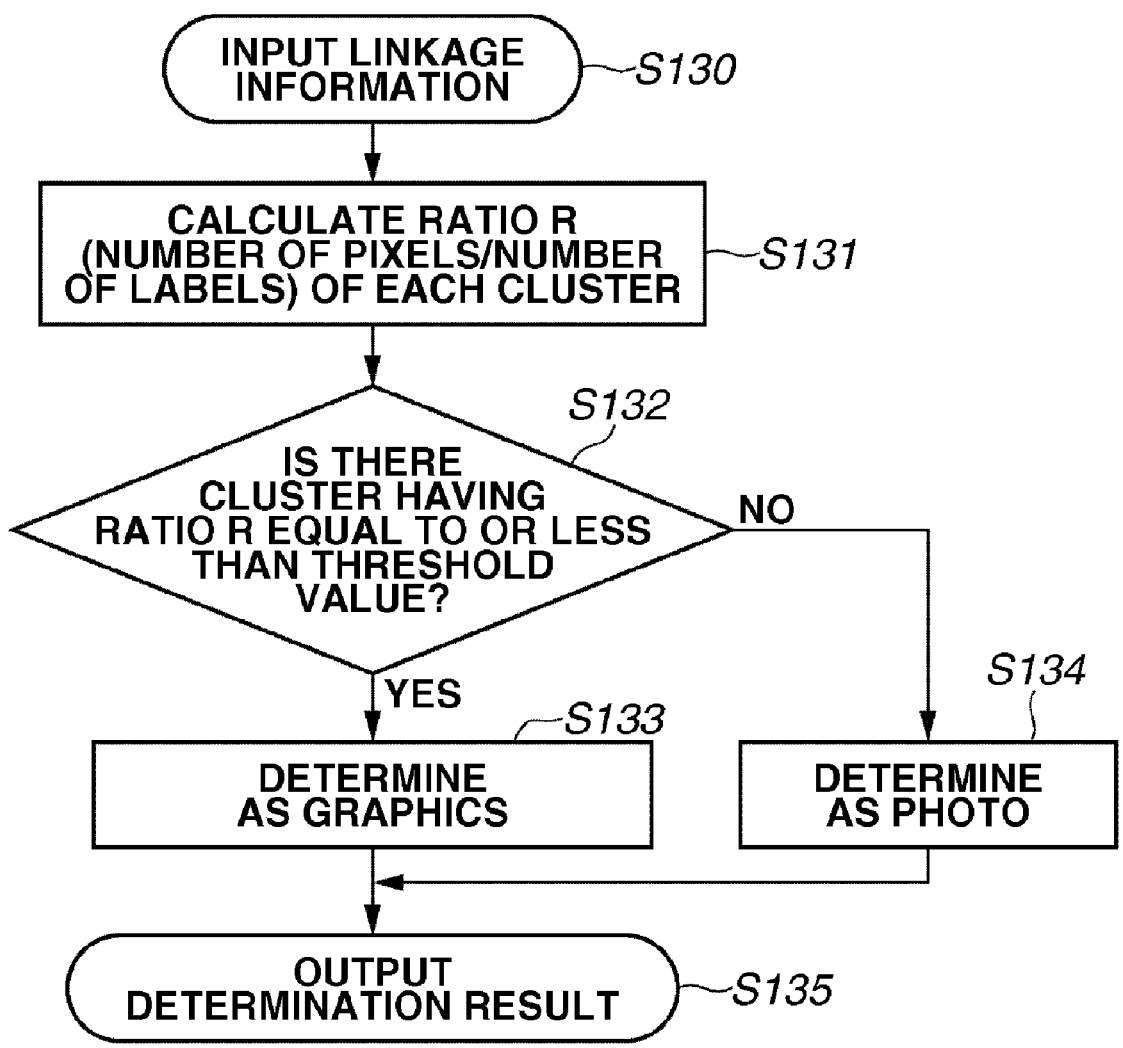
FIG. 6 is a flow chart illustrating graphics/photo determination processing in the first exemplary embodiment of the present invention.

The graphics/photo determination processing is described with reference to the flow chart in FIG. 6.

In step S130, the graphics/photo determination unit 13 inputs linkage information such as the number of pixels and the number of labels in each cluster acquired from the image.

In step S131, the graphics/photo determination unit 13 calculates a ratio R of the number of pixels to the number of labels of each cluster. In the present exemplary embodiment, the graphics/photo determination unit 13 acquires the ratio R for each cluster based on the following formula.

R=(number of pixels)/(number of labels)

In step S132, the graphics/photo determination unit 13 examines whether there is a cluster having the ratio R equal to or less than a predetermined first threshold value to determine the image. When there is a cluster having the ratio R equal to or less than the first threshold value (YES in step S132), then in step S133, the graphics/photo determination unit 13 determines the processing object image to be graphics. On the other hand, when there is not a cluster having the ratio R equal to or less than the first threshold value (NO in step S132), then in step S134, the graphics/photo determination unit 13 determines the processing object image to be photo. In addition, the first threshold value can be previously set according to a scanning resolution. In step S135, the graphics/photo determination unit 13 outputs the image determination result.

FIG. 5 illustrates an example of the case for performing graphics/photo determination for acquiring the ratio R with respect to each of the images 4a and 4b after the graphics/photo determination unit 13 acquires the linkage information. For example, when the first threshold value is 3.8, in the image 4a, there is no cluster having a low ratio R of the number of pixels to the number of labels and thus, the graphics/photo determination unit 13 determines the image to be photo. On the other hand, in the image 4b, the ratios of the number of pixels the number of labels in the cluster numbers 3, 7, and 9 are relatively low and thus, the graphics/photo determination unit 13 determines the image to be graphics.

A basis of the graphics/photo determination processing based on the linkage information is described with reference to FIG. 7.

Figure 7:
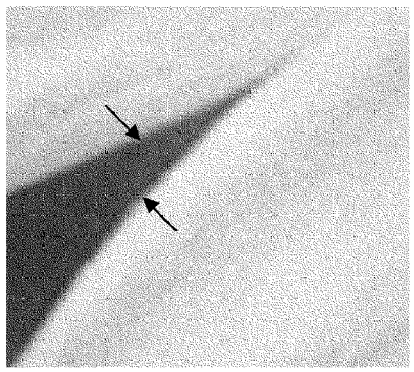
FIG. 7 illustrates magnified views of examples of an input image and a result of clustering.
Figure 7:
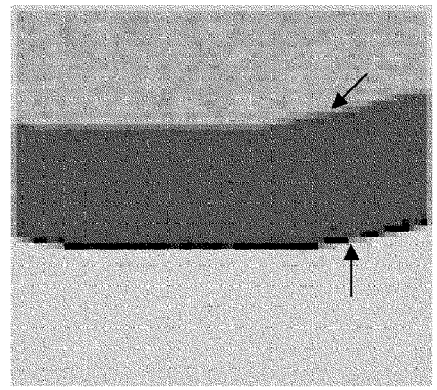
Figure 7:
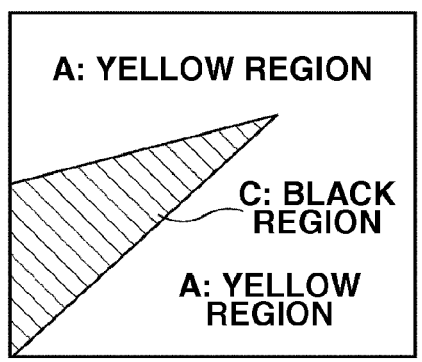
Figure 7:
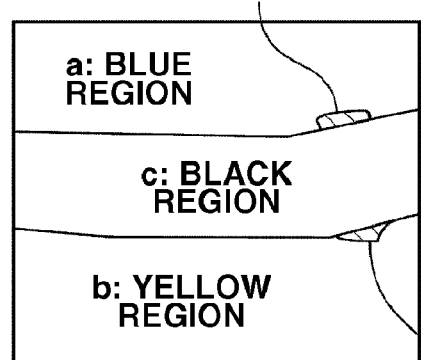

An image 7a in FIG. 7 is a magnified view of a part of the image 4a (a photo image) in FIG. 4. An image 7b in FIG. 7 is a magnified view of the image 4b (graphics) in FIG. 4. Further, FIG. 7 illustrates clustering results 7c and 7d of parts of the image 7a and image 7b, respectively.

Since a photo has numerous pixels but has features that color smoothly changes, pixels near an edge of the color region of each color also gradually changes color. Therefore, in photo clustering processing, photo color regions are segmented into collected color regions including pixels near the edge of the color region. For example, in the image 7a, when an edge part is indicated by an arrow, in the result 7c by clustering processing of the image 7a, the pixels near the edge do not come to be an independent color region but enters into a color region having a similar color, and thus the collected color regions of yellow color and black color are acquired.

On the other hand, in graphics, a color of each color region clearly changes, and a noise region easily occurs at a region, where a color rapidly changes, by effects of scanning and compressing. The noise region is present near an edge of the color region, has an intermediate color between adjusting color regions, and often has a fully different color from the color of an adjacent region. Therefore, in the clustering processing, a small region of noise cannot be integrated into a main color region, and is thus determined as an independent cluster. As a result of this, some clusters having a low ratio of the number of pixels to the number of labels appear. In other words, a cluster having a small number of pixels per one label is considered to be a cluster of a small noise region. For example, in the image 7b, a region of color changing (an edge part) is indicated by an arrow. At this time, in the result of clustering processing 7d for the image 7b, the regions having a near color, that is, a blue region, a black region, and a yellow region, become respective collected clusters, but an intermediate color region between the adjacent color regions occurs near an edge, so that the intermediate color region becomes another cluster.

In the present exemplary embodiment, the image processing apparatus performs segmentation processing based on such features of photo and graphics.

The reprocessing of a minute region (a region determined as a noise) included in an image determined as graphics is described. At first, the graphics minute region reprocessing unit 14 determines whether each label region is a nose region based on linkage information of the image. More specifically, the graphics minute region reprocessing unit 14 determines a nose region based on the number of pixels of the linked pixels (a label region) given each label in each cluster. When the number of pixels in the label region is equal to or less than a certain threshold value, the graphics minute region reprocessing unit 14 determines the linked pixels given the labels to be a noise region, and makes the label region to be an object of the minute reprocessing. Then, the graphics minute region reprocessing unit 14 calculates a similarity of color between the noise region, which is a reprocessing object of the minute region, and each cluster to which pixels around the noise region belong. Then, the graphics minute region reprocessing unit 14 integrates the noise region into a cluster having the highest degree of similarity.

As described above, in the present exemplary embodiment, the image processing apparatus performs clustering processing on a processing object image, acquiring the number of labels and the number of pixels of each cluster, and determining photo or graphics based on the linkage information of each cluster (the number of labels and the number of pixels). According to such processing, the image processing apparatus can accurately determine whether an image is graphics or photo.

The first exemplary embodiment is an example for determining whether an image is graphics or photo based on linkage information. In a second exemplary embodiment of the present invention, the image processing apparatus first determines whether an input image is graphics or photo and, then, determines whether the image determined as graphics is suitable for vectorization.

Figure 8:
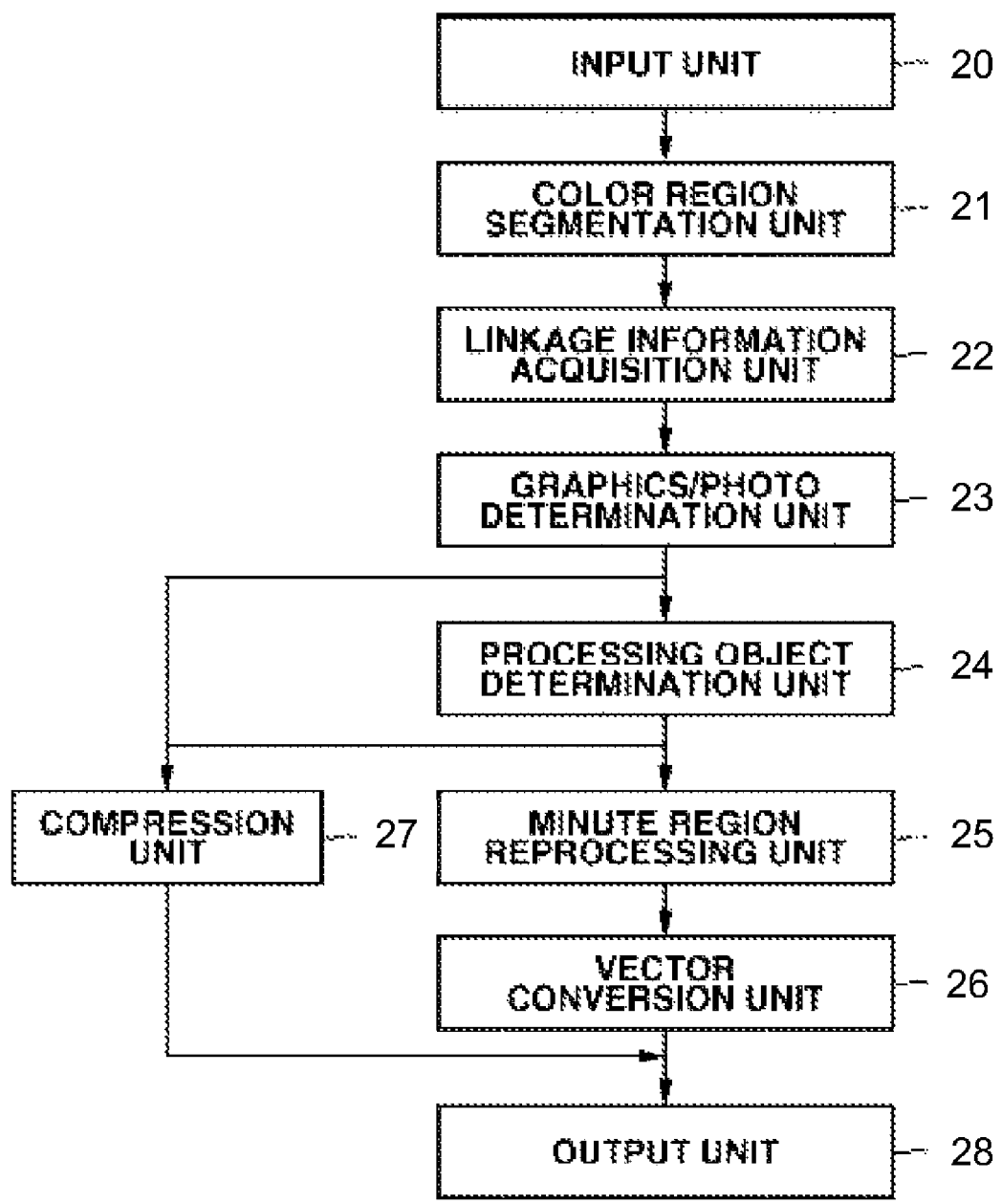
FIG. 8 is a block diagram illustrating a configuration of an image processing apparatus according to a second exemplary embodiment of the present invention.

FIG. 8 is a block diagram illustrating a configuration of an image processing apparatus according to the second exemplary embodiment. In FIG. 8, an input unit 20 inputs an image, which is a processing object. A color region segmentation unit 21 segments the input processing object image into regions for respective colors (color regions). A linkage information acquisition unit 22 performs identification (labeling processing) of linked pixels configuring each color region, and acquires information about the linked pixels (linkage information). A graphics/photo determination unit 23 determines whether the processing object image is graphics or photo based on the linkage information. A processing object determination unit 24 determines whether an image determined as graphics by the graphics/photo determination unit 23 is suitable for vectorization. A minute region reprocessing unit 25 reprocesses a noise region generated by scanning or compressing in an image determined as graphics suitable for vectorization. A vector conversion unit 26 vectorizes the color region with noise removed. A compression unit 27 compresses an image determined as photo by the graphics/photo determination unit 23, or an image determined as graphics not suitable for vectorization by the processing object determination unit 24 (for example, a complex graphics), by JPEG. An output unit 28 outputs a processing result.

Figure 9:
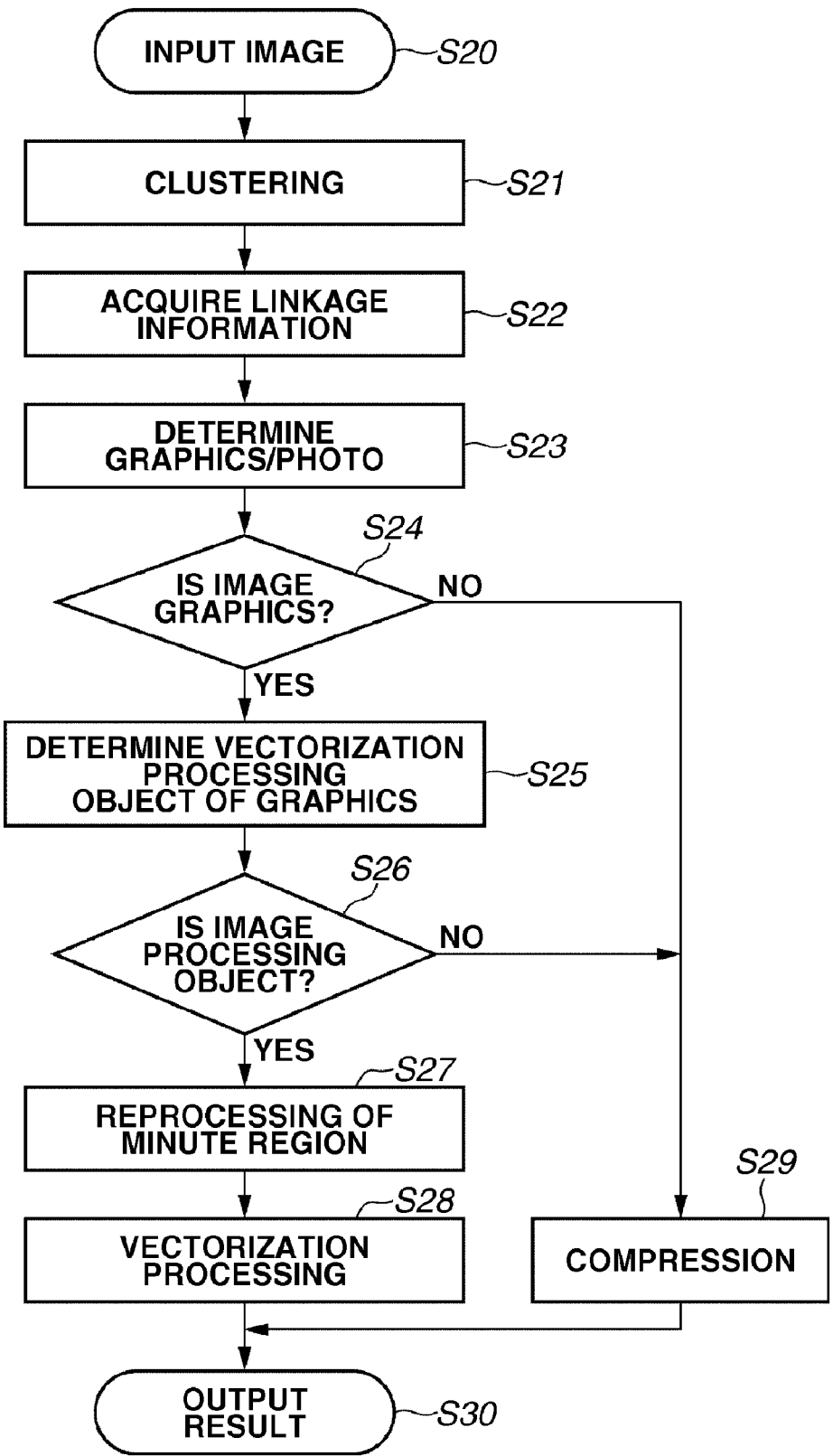
FIG. 9 is a flow chart illustrating a process for switching between vectorization processing and compression processing in the second exemplary embodiment.

FIG. 9 is a flow chart illustrating a process for switching between vectorization processing and compression processing in the second exemplary embodiment.

In the second exemplary embodiment, when the CPU 2001 executes a computer program, the image processing apparatus performs processing according to the flow chart illustrated in FIG. 9, and attains each function block illustrated in FIG. 8. More specifically, the processing in step S20 in FIG. 9 corresponds to the processing performed by the input unit 20 in FIG. 8. The processing in step S21 in FIG. 9 corresponds to the processing performed by the color region segmentation unit 21 in FIG. 8. The processing in step S22 in FIG. 9 corresponds to the processing performed by the linkage information acquisition unit 22 in FIG. 8. The processing in step S23 in FIG. 9 corresponds to the processing performed by the graphics/photo determination unit 23 in FIG. 8. The processing in step S25 in FIG. 9 corresponds to the processing performed by the processing object determination unit 24 in FIG. 8. The processing in step S27 in FIG. 9 corresponds to the processing performed by the minute region reprocessing unit 25 in FIG. 8. The processing in step S28 in FIG. 9 corresponds to the processing performed by the vector conversion unit 26 in FIG. 8. The processing in step S29 in FIG. 9 corresponds to the processing performed by the compression unit 27 in FIG. 8. The processing in step S30 in FIG. 9 corresponds to the processing performed by the output unit 28 in FIG. 9. These processing steps are described below with reference to FIG. 9.

At first, in Step S20, the input unit 20 inputs an image, which is a processing object. The input image may be a photo image or a graphics image. Further, the graphics image may be graphics suitable for vectorization processing or graphics unsuitable for vectorization processing due to the inclusion of many small-size color regions.

In step S21, the color region segmentation unit 21 performs color region segmentation processing for segmenting the input image into regions for respective colors (color regions). In the present exemplary embodiment, the color region segmentation unit 21 implements color segmentation of the image by clustering processing.

In step S22, the linkage information acquisition unit 22 acquires information about clusters (linkage information), such as the number of labels and the number of pixels of each cluster.

In step S23, the graphics/photo determination unit 23 determines whether the image is graphics or photo based on the number of labels and the number of pixels of each cluster, which is acquired in step S22. The determination processing of graphics/photo is similar to the processing in the first exemplary embodiment. In step S24, the graphics/photo determination unit 23 determines whether the image is determined as graphics or determined as photo by the determination processing in step S23. If the image is determined as graphics (YES in step S24), the processing proceeds to step S25. If the image is determined as photo (NO in step S24), the processing proceeds to step S29.

In step S25, the processing object determination unit 24 determines whether the image determined as graphics is graphics suitable for vectorization processing or graphics unsuitable for vectorization processing. In step S26, the processing object determination unit 24 makes the image determined as the graphics suitable for vectorization processing to be a vectorization processing object, and the processing then proceeds to step S27. Further, the processing object determination unit 24 makes the image determined as the graphics unsuitable for vectorization processing to be an image out of vectorization processing object, and the processing then proceeds to step S29. The processing object determination processing is described below in detail.

In step S27, the minute region reprocessing unit 25 detects any noise region that is present in the image determined as the processing object in step S26, and performs reprocessing on the noise region. In step S28, the vector conversion unit 26 performs vectorization processing for converting each color region, in which the noise is reprocessed, into vector data.

In step S29, the compression unit 27 compresses the image determined as photo by the graphics/photo determination processing in step 23 and the image determined as graphics unsuitable for vectorization processing in step S25, by JPEG.

In step 30, the output unit 28 outputs the result of vectorization processing of the image in step S28, or the result of compression processing in step S29.

Figure 10:
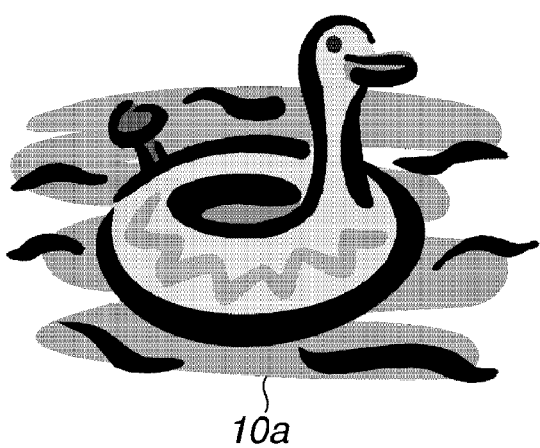
FIG. 10 illustrates examples of an input image.
Figure 10:
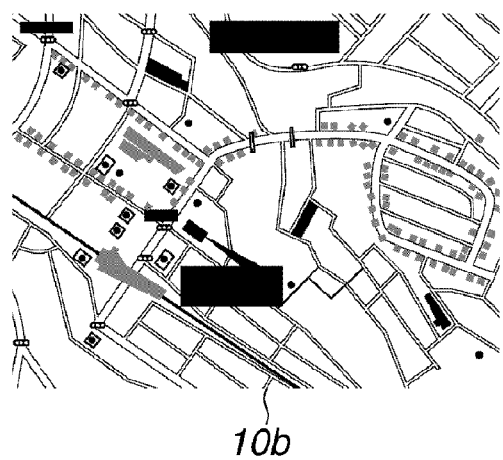

Images 10*a* and 10*b* illustrated in FIG. 10 are examples of input graphics images according to the second exemplary embodiment. The input graphics image may be an image having many large-size color regions and suitable for vectorization processing, such as the image 10*a*, or an image having many small-size color regions and unsuitable for vectorization processing, such as the image 10*b*. If the vector conversion unit 26 performs vectorization processing on the image unsuitable for vectorization processing, a quality of the image may decrease.

Figure 11:
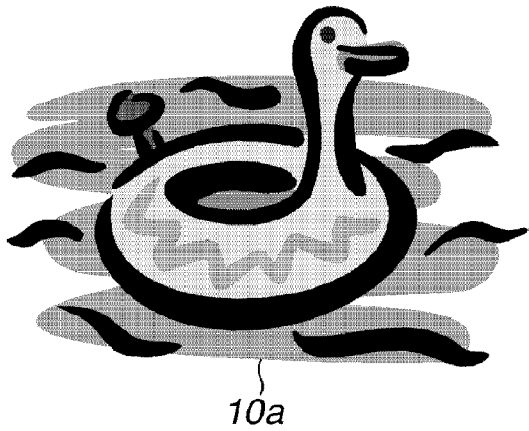
FIG. 11 illustrates examples of linkage information acquired after clustering processing.
Figure 11:
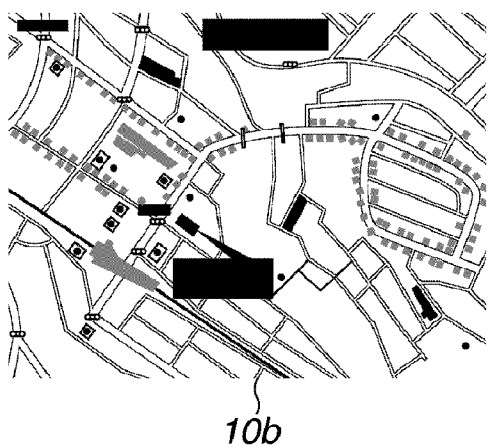

FIG. 11 illustrates examples of a result of linkage information acquired after the linkage information acquisition processing unit 22 performs clustering processing on the images 10*a* and 10*b* illustrated in FIG. 10 in the second exemplary embodiment. The linkage information acquisition processing unit 22 separates the image into 12 clusters for respective colors having cluster numbers 1 to 12. Further, the linkage information acquisition processing unit 22 performs labeling processing on pixels belonging to each cluster to acquire the number of labels. The labeling processing is processing for giving the same label with respect to pixels linking at either of vertical, horizontal, and oblique positions (adjoining pixels), and other labels are given to the linked pixels in the distant position. The linkage information acquisition unit 22 acquires the number of labels based on a result of the labeling processing on the pixels belonging to each cluster. More specifically, the number of labels indicates that how many groups of linked pixels are present in pixels determined to belong to the same color cluster. The linkage information acquisition unit 22 further acquires the number of pixels belonging to each cluster. FIG. 11 illustrates an acquired result of a cluster number, the number of labels in each cluster, and the number of pixels belonging to each cluster for each of the processing object images 10*a* and 10*b*. In the present exemplary embodiment, the cluster number, the number of labels, and the number of pixels are referred to as linkage information.

The graphics/photo determination processing (step S23) is performed similar to the processing in the first exemplary embodiment. Further, the processing object determination unit 24 determines whether the image determined as graphics by the graphics/photo determination processing (step S23) is graphics suitable for vectorization processing (S25). The processing object determination unit 26 determines that the image having clusters equal to or greater than a second threshold value of the number of labels is graphics unsuitable for vectorization processing (graphics out of vectorization processing object). On the other hand, the processing object determination unit 26 determines that the image not having clusters equal to or greater than the second threshold value is graphics suitable for vectorization processing. In addition, the second threshold value can be predetermined according to an image size or scanning resolution.

FIG. 11 illustrates examples of a result of linkage information (the number of labels/the number of pixels of each cluster) acquired on the respective images 10*a* and image 10*b*. The graphics/photo determination unit 23 acquires a ratio R. For example, when the graphics/photo determination unit 23 performs graphics/photo determination processing using a threshold value of 3.8, the ratios R of the cluster numbers 3, 7, and 8 in the image 10*a* become lower than the threshold value. Further, the ratios R of the cluster number 3, 6, and 12 in the image 10*b* become lower than the threshold value. Accordingly, in the graphics/photo determination processing (step S23), the graphics/photo determination unit 23 determines that both the image 10*a* and image 10*b* are graphics. Then, in the processing object determination processing (step S25), the processing object determination unit 24 compares the number of labels with the second threshold value. For example, when the second threshold value is 1000, there are no clusters having the number of labels equal to or greater than the second threshold value in the image 10*a*, so that the processing object determination unit 24 determines that the image is graphics of the vectorization processing object. On the other hand, there are clusters having the number of labels equal to or greater than the second threshold value in the image 10*b*, so that the processing object determination unit 24 determines that the image is out of the vectorization processing object. More specifically, an image having a great number of labels, such as the image, includes many minute regions. If the vector conversion unit 26 performs vectorization processing on the image 10*b*, the amount of data increases. Therefore, the processing object determination unit 24 determines that the image 10*b* is unsuitable for vectorization.

In the second exemplary embodiment, the image processing apparatus determines an image by two-step processing, that is, the graphics/photo determination unit 23 performs graphics/photo determination processing, and then the processing object determination unit 24 performs processing object determination processing as to whether the image determined as graphics is a vectorization object. This determination is not limited to two-step processing but can be determined by one-step processing. In a third exemplary embodiment of the present invention, the image processing apparatus can perform a determination as to whether an image is vectorization object by one-step processing based on cluster information and linkage information of the image.

In a fourth exemplary embodiment of the present invention, the image processing apparatus simply determines whether an image is graphics or photo based on only the number of labels.

Photo has relatively a small number of labels for each cluster, but there is a cluster having a great number of labels in graphics. Using this feature, the image processing apparatus sets a threshold value of the number of labels and determines graphics or photo using only the number of labels. This method is described in detail below.

At first, the image processing apparatus sets a third threshold value of the number of labels. Then, the image processing apparatus determines that the image is photo when there are no clusters having the number of labels equal to or greater than the third threshold value. The image processing apparatus determines that the image is graphics when there are clusters having the number of labels equal to or greater than the third threshold value.

In a fifth exemplary embodiment of the present invention, the image processing apparatus determines whether an input image is graphics or photo using only the number of labels. When the image is determined as graphics, the image processing apparatus determines whether the image determined as graphics is graphics suitable for vectorization processing.

Photo has relatively a small number of labels for each cluster, but there is a cluster having a great number of labels in graphics. Further, in graphics, an image including many fine regions, such as a map, has relatively a great number of labels. Using this feature, the image processing apparatus sets two threshold values of the numbers of labels, and performs determination using only the number of labels. This method is described in detail below.

At first, the image processing apparatus sets two threshold values of the number of labels for determination (a third threshold value R1 and a fourth threshold value R2). The threshold values are set as R1<R2.

When there are no clusters having the number of labels equal to or greater than the third threshold value R1, the image processing apparatus determines the image as photo. When there are clusters having the number of labels equal to or greater than the third threshold value R1, the image processing apparatus determines the image as graphics.

Then, the image processing apparatus determines whether the image determined as graphics is graphics suitable for vectorization processing. When there are no clusters having the number of labels equal to or greater than the fourth threshold value R2, the image processing apparatus determines the image as graphics of a vectorization processing object. When there are clusters having the number of labels equal to or greater than the fourth threshold value R2, the image processing apparatus determines the image as an image out of vectorization processing object.

In addition, in the above-described exemplary embodiment, the image processing apparatus determines whether the image is a vectorization processing object by two-step processing. However, the image processing apparatus can perform determination by one-step processing. For example, the image processing apparatus can determine whether an image is a vectorization processing object according to whether the number of labels of each cluster is an intermediate value between the threshold values R1 and R2.

Aspects of the present invention can also be realized by a computer of a system or apparatus (or devices such as a CPU or MPU) that reads out and executes a computer-executable process recorded on a memory device to perform the functions of the above-described embodiment(s), and by a method, the steps of which are performed by a computer of a system or apparatus by, for example, reading out and executing a computer-executable process recorded on a memory device to perform the functions of the above-described embodiment(s). For this purpose, the computer-executable process is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-321625 filed Dec. 17, 2008, which is hereby incorporated by reference herein in its entirety.

What is claimed is:

1. An image processing apparatus comprising:
a color region segmentation unit configured to segment a processing object image into color regions;
a linkage information acquisition unit configured to acquire information about linkage regions in each segmented color region,
wherein the information acquired by the linkage information acquisition unit includes a number of linkage regions in each segmented color region and a number of pixels of each segmented color region; and
a determination unit configured to determine whether the processing object image is graphics based on the information acquired by the linkage information acquisition unit.

2. The image processing apparatus according to claim 1, wherein the determination unit is configured to acquire a ratio of the number of pixels to the number of linkage regions, and to determine whether the processing object image is graphics based on whether there is a color region having the ratio equal to or less than a first threshold value.

3. The image processing apparatus according to claim 1, further comprising a processing object determination unit configure to determine whether a processing object image determined as graphics by the determination unit is a processing object image suitable for vectorization processing based on the number of linkage regions in each color region.

4. The image processing apparatus according to claim 3, wherein the processing object determination unit is configured to determine that the processing object image is not suitable for vectorization processing when there is a color region having the number of linkage regions equal to or greater than a second threshold value.

5. The image processing apparatus according to claim 1, wherein the color region segmentation unit is configured to segment the processing object image into the color regions by performing clustering processing.

6. The image processing apparatus according to claim 1, further comprising a vectorization unit configured to vectorize the processing object image.

7. An image processing apparatus comprising:
a color region segmentation unit configured to segment a processing object image into color regions;
a linkage information acquisition unit configured to acquire information about linkage regions in each segmented color region,
wherein the information acquired by the linkage information acquisition unit includes a number of linkage regions in each segmented color region; and
a determination unit configured to determine whether the processing object image is graphics based on the information acquired by the linkage information acquisition unit,
wherein the determination unit is configured to determine whether the processing object image is graphics based on whether there is a color region having the number of linkage regions equal to or greater than a third threshold value.

8. An image processing apparatus comprising:
a color region segmentation unit configured to segment a processing object image into color regions;
a linkage information acquisition unit configured to acquire information about linkage regions in each segmented color region,
wherein the information acquired by the linkage information acquisition unit includes a number of linkage regions in each segmented color region; and
a determination unit configured to determine whether the processing object image is graphics based on the information acquired by the linkage information acquisition unit,
wherein the determination unit is configured to determine that the processing object image is graphics suitable for vectorization processing when there is a color region having the number of linkage regions equal to or greater than a third threshold value and there is no color region having the number of linkage regions equal to or greater than a fourth threshold value.

9. An image processing apparatus comprising:
a color region segmentation unit configured to segment a processing object image into color regions;
a linkage information acquisition unit configured to acquire information about linkage regions in each segmented color region,
wherein the linkage information acquisition unit is configured to acquire the information about linkage regions in each segmented color region by performing labeling processing; and
a determination unit configured to determine whether the processing object image is graphics based on the information acquired by the linkage information acquisition unit.

10. An image processing method comprising:
segmenting a processing object image into color regions;
acquiring information about linkage regions in each segmented color region,
wherein the information acquired includes a number of linkage regions in each segmented color region and a number of pixels of each segmented color region; and
determining whether the processing object image is graphics based on the acquired information.

11. A non-transitory computer-readable storage medium storing a computer-executable process, the computer-executable process causing a computer to implement a method comprising:
segmenting a processing object image into color regions;
acquiring information about linkage regions in each segmented color region,
wherein the information acquired includes a number of linkage regions in each segmented color region and a number of pixels of each segmented color region; and
determining whether the processing object image is graphics based on the acquired information.

* * * * *